May 31, 1966 C. E. ASHLINE 3,253,573
IMPACT RESPONSIVE DISTRESS SIGNAL DEVICE
Filed April 23, 1963 3 Sheets-Sheet 1
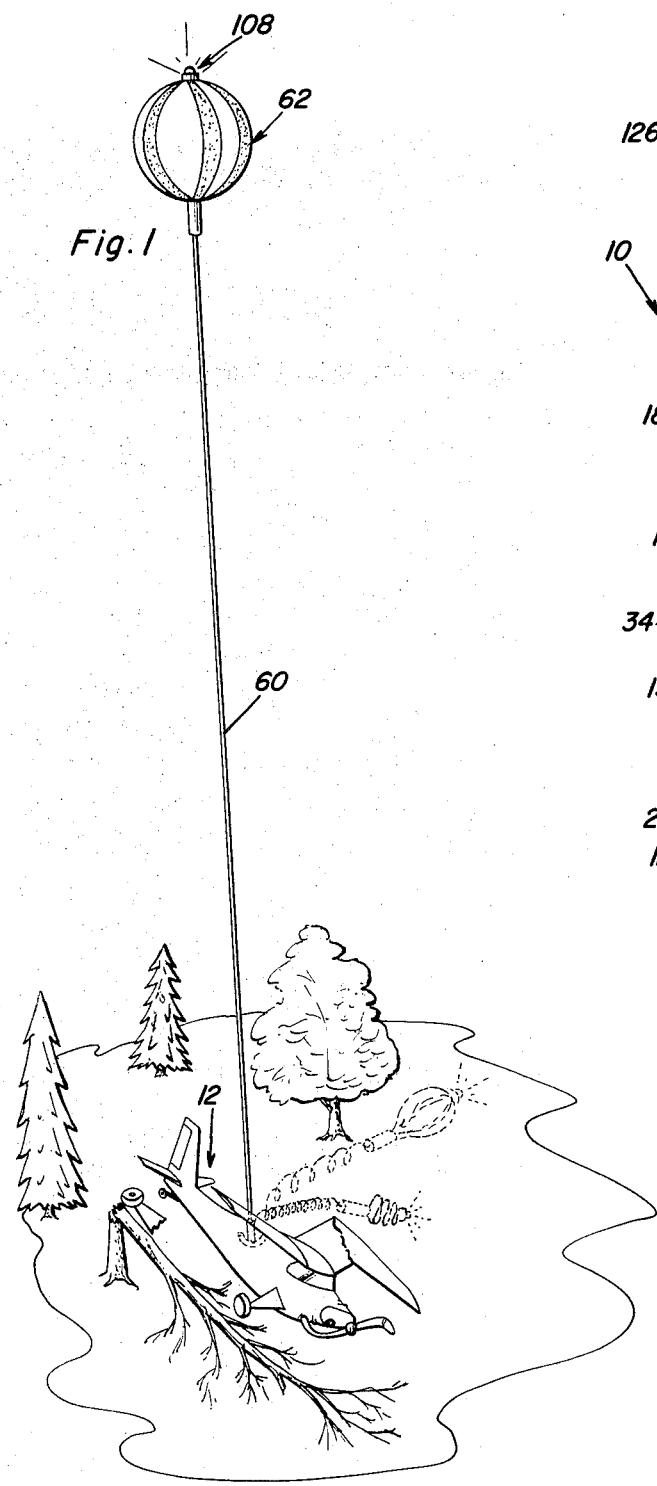
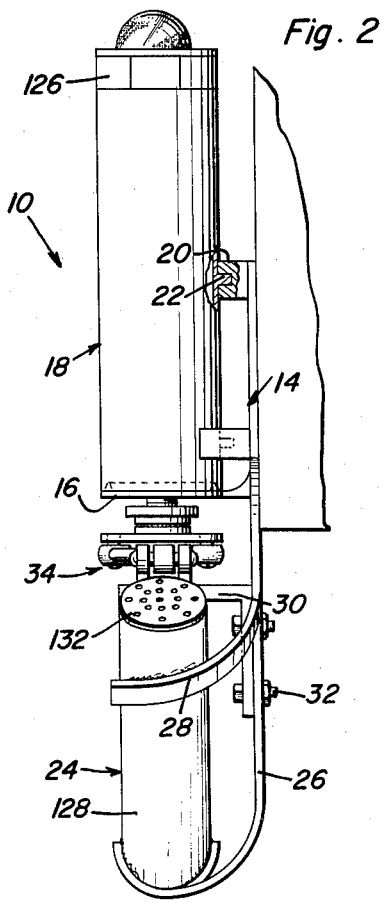
Clifford E. Ashline
INVENTOR.
BY
Attorneys May 31, 1966 C. E. ASHLINE 3,253,573
IMPACT RESPONSIVE DISTRESS SIGNAL DEVICE
Filed April 23, 1963 3 Sheets-Sheet 2
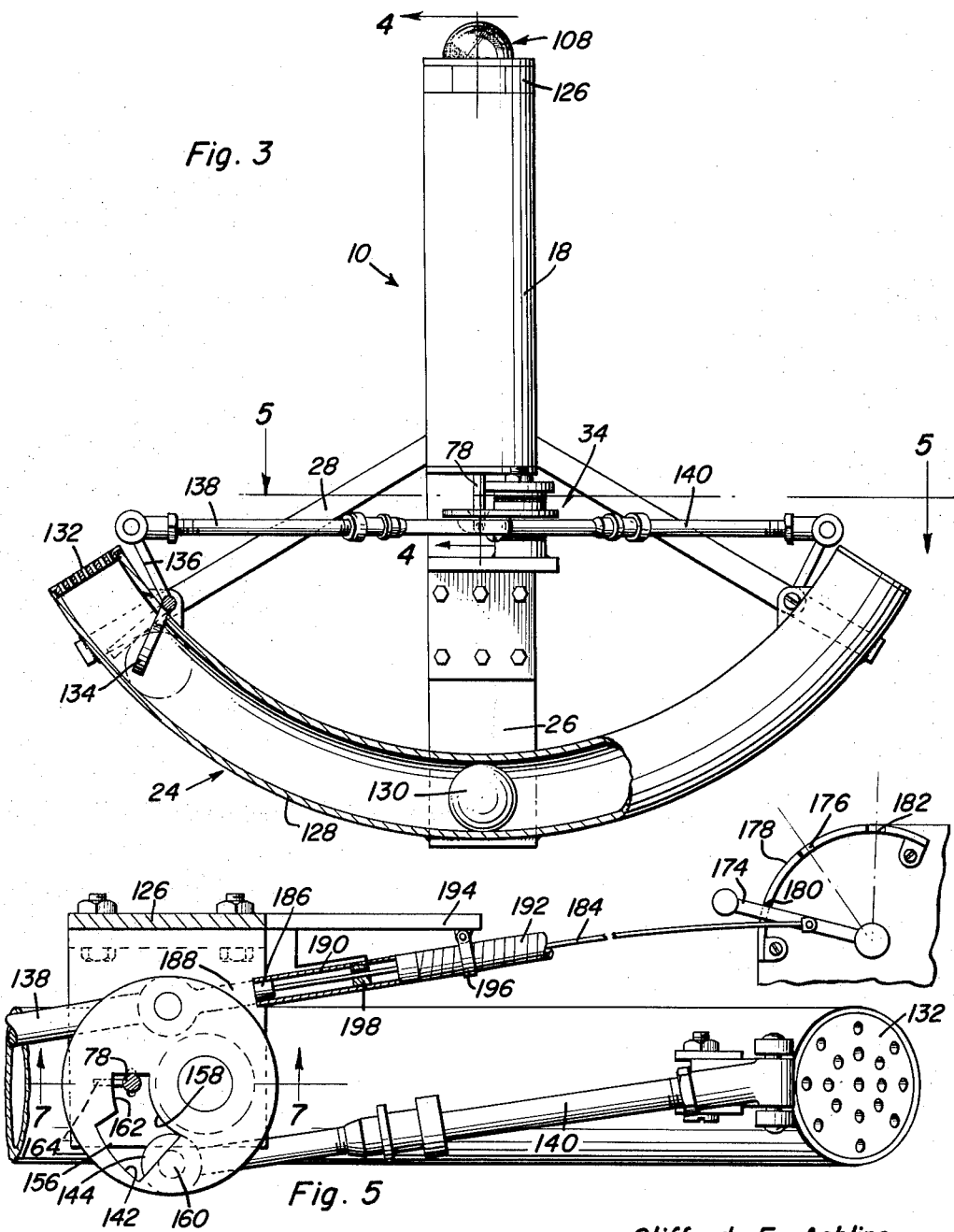
Clifford E. Ashline
INVENTOR.

May 31, 1966  C. E. ASHLINE  3,253,573
IMPACT RESPONSIVE DISTRESS SIGNAL DEVICE
Filed April 23, 1963  3 Sheets-Sheet 3

Clifford E. Ashline
INVENTOR.

BY *Clarence A. O'Brien*
*and Harvey B. Jacobson*
Attorneys

United States Patent Office 3,253,573
Patented May 31, 1966

3,253,573
IMPACT RESPONSIVE DISTRESS SIGNAL DEVICE
Clifford E. Ashline, Anchorage, Alaska (4920 NE.
Glisan, Apt. 302, Portland, Oreg. 97213)
Filed Apr. 23, 1963, Ser. No. 275,087
13 Claims. (Cl. 116—124)

This invention relates to location indicating apparatus utilized under emergency conditions.

The location indicating signal apparatus of the present invention is useful in connection with the location of individuals or vehicles in emergency situations including by way of example, hunters, hikers, as well as land, marine and airborne vehicles employed for commercial, recreational or military purposes.

It is therefore a primary object of the present invention to provide apparatus that is reliable in operation, easily installed in a variety of different installations and effective in accomplishing the purposes under all situations.

Another object of the present invention is to provide a signal locating device which is capable of being readily installed and inspected without disassembly.

A further object of the present invention is to provide a signal locating device as aforementioned requiring minimum structural modification of any vehicle in which it is installed and yet reliably operative in response to impact or crash of the vehicle.

In accordance with the foregoing objects, the signal locating device of the present invention involves a launching mechanism mounted within a launching guide tube by means of which an inflatable balloon is ejected with its inflating mechanism and with a signal emitting device mounted thereon which forms a weather protective closure for the launching guide tube prior to ejection. The ejecting mechanism is rendered operative in response to a selectively controlled release assembly which may also be associated with a novel inertia responsive device by means of which the apparatus may be set into operation by impact occurring because of the crash of the vehicle in which the apparatus is installed. It should of course be appreciated, that the apparatus may be triggered or released for operation under manual control when utilized for example by hunters on expeditions. Accordingly, the apparatus of the present invention contemplates changes in size and method of triggering in accordance with the various uses aforementioned even though the invention is described in connection with an airborne type of vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an exemplary illustration of the use to which the apparatus of the present invention may be put.

FIGURE 2 is a side elevational view of the apparatus shown mounted in any typical vehicle installation.

FIGURE 3 is a front elevational view of the apparatus shown in FIGURE 2 with parts broken away and shown in section.

FIGURE 5 is a partial sectional view taken substantially through a plane indicated by section line 5—5 in FIGURE 3.

Figure 4:
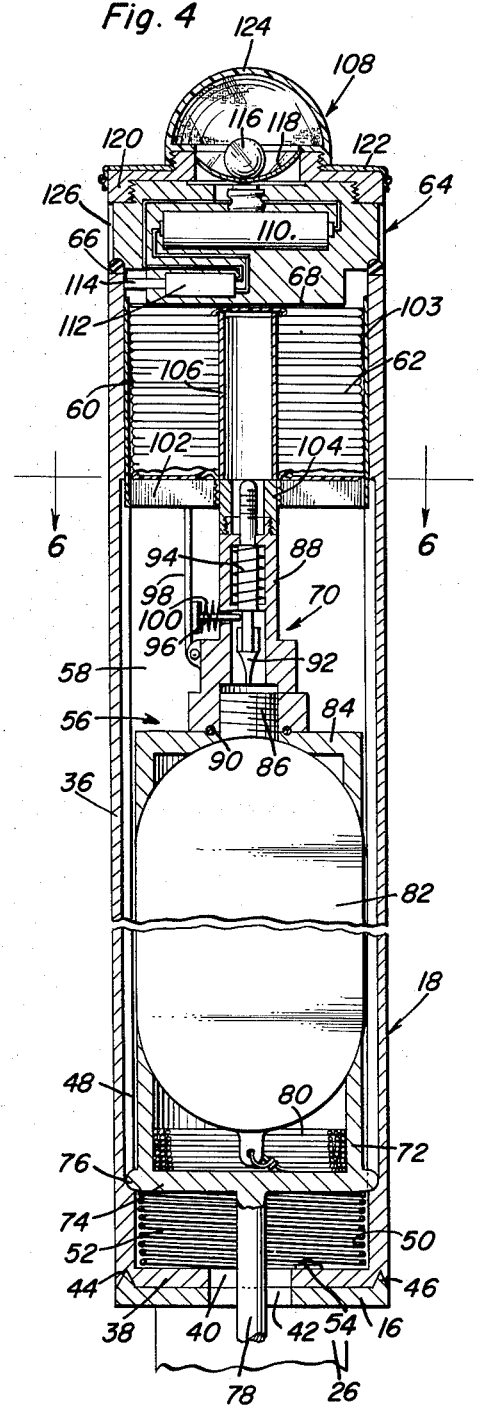
FIGURE 4 is an enlarged partial sectional view taken substantially through a plane indicated by section line 4—4 in FIGURE 3.
Figure 6:
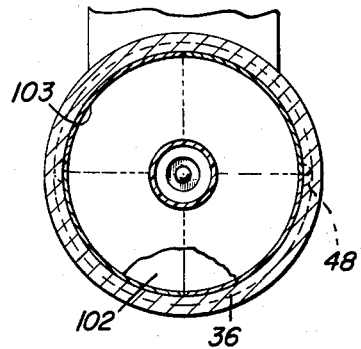
FIGURE 6 is a transverse sectional view taken substantially through a plane indicated by section line 6—6 in FIGURE 4.

Referring now to the drawings in detail, the apparatus generally referred to by reference numeral 10 in FIGURES 2 and 3, is shown in various stages of operation in FIGURE 1. Accordingly, it will be observed from FIGURE 1, that the apparatus is mounted in an aircraft type of vehicle 12 so that when the aircraft has crashed as shown, the apparatus will be launched therefrom in various stages shown by dotted lines until a signal is produced by the apparatus at a relatively high elevation as shown by solid line in FIGURE 1. Although signal locating devices of this type have heretofore been devised, the apparatus of the present invention will be more useful in view of its installational simplicity, its ability to withstand adverse weather conditions and the greater reliability in its operation.

As seen in FIGURES 2 and 3, the apparatus 10 is mounted on the vehicle by means of a bracket assembly generally referred to by reference numeral 14 which includes a centering base portion 16 receiving thereabove a launching guide tube assembly generally referred to by reference numeral 18. Also connected to the mounting bracket assembly 14 are spaced tube aligning members 20 which receive tube aligning pins 22 projecting from the launch tube guide assembly 18. Also secured to the mounting bracket assembly 14, is an inertia responsive device generally referred to by reference numeral 24 secured as by welding to a vertically disposed central portion 26 and a pair of diverging arm portions 28. A supporting bracket member 30 secured to the central portion 26 of the bracket assembly by means of the fastener assemblies 32, supports a selectively controlled release assembly generally referred to by reference numeral 34 which operatively interconnects the inertia responsive device 24 with the operating components within the launching guide tube assembly 18.

Referring now to FIGURE 4 in particular, it will be observed that the launching guide tube assembly 18 is formed by a tubular member 36 preferably made of a high impact resistant plastic material. The lower end portion 38 of the tubular member 36 is provided with a central opening 40 aligned with a central opening 42 within the supporting base portion 16 and is also provided with tube centering recesses 44 adapted to receive the tube centering projections 46 on the supporting base portion 16 whereby the tubular member 36 is supported in axially aligned position necessary for proper operation of the apparatus as will become hereafter apparent. Formed internally of the tubular member 36, are a pair of diametrically opposed grooves 48 adapted to receive and guide longitudinal movement of a balloon inflation assembly adapted to be launched from the tubular member. Accordingly, the lower end portion of the tubular member forms a chamber 50 for a launching spring 52 anchored to the bottom portion 38 by the fastener 54. The spring 52 in a compressed condition may thereby exert an upward launching force on the inflation assembly 56 housed within the intermediate chamber portion 58 of the tubular member. An upper chamber portion 60 is formed within the tubular member for housing there within a molybdenum treated inflatable balloon 62 disposed in folded condition. A closure assembly generally referred to by reference numeral 64 is seated at the upper end of the tubular member provided with a weather seal element 66. The closure assembly 64 is therefore cemented at 68 to the upper end of the balloon 62. Operatively mounted between the balloon 62 and the inflation assembly 56, within the chamber 58, is the releasable puncturing assembly generally referred to by reference numeral 70 whereby the balloon is inflated following launching from the tubular member 36 upon release of the inflation assembly 56 so that it may be ejected by the force of the launching spring 52. The folded balloon is also enclosed by anti-friction liners 103.

The launching spring 52 therefore forms part of an ejecting mechanism which includes a tubular seating member 72 against which the launching spring 52 bears. The seating member is provided with a bottom portion 74 having guide elements 76 projecting therefrom adapted to be received within the grooves 48 of the tubular member so as to longitudinally guide movement of the components ejected from the launching guide assembly 18. Connected to the bottom portion 74 of the seating member centrally thereof and extending downwardly through the openings 40 and 42, is a releasable anchoring rod 78 by means of which the seating assembly is held in its position illustrated in FIGURE 4. Secured to the seating member and folded there within, is a relatively long anchor line 80 which is also connected to the lower end of the inflation assembly which includes a cylinder 82 of compressed gas such as helium with which the balloon 62 is inflated. Mounted at the upper end portion of the cylinder 82, is a seating base member 84 through which an outlet end portion 86 of the cylinder projects. The outlet end portion 86 is therefore adapted to be punctured by the releasable puncturing assembly 70 so that the gas within the cylinder 82 may be discharged into the balloon 62 for inflation thereof.

The assembly 70 includes a tubular passage body 88 mounted in axial alignment with the cylinder 82 by means of the centering O-ring element 90. Slidably mounted within the passage member 88, is a puncture element 92 held in a retracted position against the bias of a main spring 94 by means of a holding pin 96 connected to a trigger lever 98. The trigger lever 98 is pivotally mounted on the member 88 and is biased by the spring 100 to a position withdrawing the holding pin 96 from engagement with the puncturing element 92. The puncturing element when released will therefore be projected by the force of the spring 94 into the outlet end 86 of the gas cylinder so that the gas under pressure may be discharged therefrom through vent passages formed in the passage member 88. The puncture element 92 is however held withdrawn against the bias of the spring 94 by the trigger lever 98 being held in the illustrated condition against the bias of the spring 100 by means of the breakaway segments 102 disposed in assembled condition within the tubular member 36 bearing against the upper end of the trigger lever 98. The segments 102 therefore form a partition about a balloon attachment fitting 104 to which the lower end of the balloon 62 is attached. Accordingly, when the inflation assembly 56 together with the assembly 70 are ejected from the tubular member, the segments 102 will fall away and thereby release the trigger lever 98. The spring 100 will therefore withdraw the holding pin 96 so as to release the piercing element 92 which will then pierce the gas cylinder outlet so that gas may be discharged into the balloon 62 through the tube element 106. After launching, the segmental liners 103 will also fall away.

The tube element 106 is disposed within the chamber 60 of the tubular member 36 centrally of the balloon 62 and axially aligned with the attachment fitting 104 threadedly secured to the upper end of the passage member 88. A vortical flow of gas will thereby be conducted to the upper end of the balloon 62 to which the tube 106 is attached so as to effectively direct inflation pressure at the proper location in order to effectively inflate and expand the balloon 62 with the closure assembly 64 supported thereabove. The balloon 62 as shown in FIGURE 1 may therefore be coated with fluorescent stripes for better visibility. The closure assembly 64 may also mount a signal-emitting assembly 108 so that a location indicating signal may be provided at all times including nighttime.

The closure assembly 64 may therefore form a casing for the battery 110 electrically connected to a switch 112 also mounted within the closure assembly 64 having an actuator 114 adapted to be released upon ejection of the closure assembly from the tubular member 36 whereby electrical connections are made from the battery 110 to the socketed light-emitting bulb 116 projecting above the reflector element 118 mounted in a removable closure element 120. Also threadedly mounted on the closure element 120 in engagement with the weather seal 122, is an amber signal shield 124 through which light from the bulb 116 is emitted. Also, reflector elements 126 may be externally mounted on the closure assembly 64 for reflecting light in order to enhance visibility. It will therefore be apparent, that when the apparatus is launched, the balloon 62 together with the puncturing assembly 70 and the inflation assembly 56, will be ejected from the vehicle and in response to such ejection, the signal-emitting device 108 will be set into operation and the gas cylinder 82 punctured so as to begin inflation of the balloon. The balloon with the signal-emitting device 108 on top thereof will then rise to a height determined by the length of the anchoring line 60 so as to provide a locational signal that is visible from great distances.

It will be appreciated, that in view of the mechanical ejection of the components from the launching tube 36, all of the components will be cleared of the vehicle so that the balloon may be inflated and elevate the signal-emitting device without interference. Launching of the components from the launching guide assembly 18 will therefore occur in response to emergency conditions or under selective control.

Figure 7:
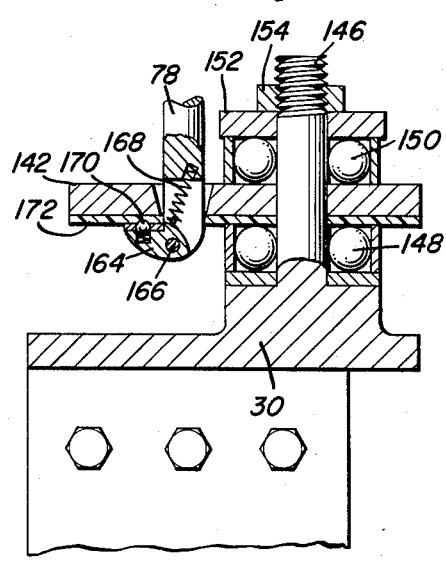
FIGURE 7 is a partial sectional view taken substantially through a plane indicated by section line 7—7 in FIGURE 5.

Referring now to FIGURES 3, 5 and 7, it will be observed that the inertia-responsive device provides facilities for effecting the launching in response to impact that occurs for example when the vehicle crashes. The inertia-responsive device therefore includes an arcuate tube 128 which is plastic lined and contains there within a freely movable steel impact ball 130. The arcuate tube 128 is mounted in fixed relation to the launching guide assembly 18 and is closed at its opposite ends by means of end cover elements 132 that prevent entry of debris into the arcuate tube which could retard free movement of the steel ball 130. The end covers 132 nevertheless permit the free flow of air so that there will be no pressure retardation in the movement of the impact sensing inertia ball 130. When the vehicle in which the apparatus is mounted experiences impact forces of a predetermined magnitude, the ball 130 will be displaced toward one end or the other of the arcuate tube sufficient to engage and displace impact sensing elements 134 which are pivotally mounted adjacent the opposite ends of the arcuate tube. The impact sensing elements 134 are therefore connected to crank elements 136 through which impact sensing movement is communicated to the selectively controlled release assembly 34.

A pair of actuating link assemblies 138 and 140 are respectively pivotally connected to the crank elements 136 so that pivotal movement of either impact sensing element 134 will impart angular displacement to a movable plate element 142 of the release assembly 34 in one direction only. Accordingly, as viewed in FIGURE 5, the movable plate element 140 is displaceable in a clockwise direction by means of the link assembly 138 or the link assembly 140 pivotally connected by pivot assemblies 144 to diametrically opposite sides of the movable plate member 142. The movable plate member 142 is rotatably mounted on the supporting bracket 30 about an axis eccentric to the plate member 142 established through a mounting stud 146 secured to the supporting base 30 and projecting upwardly therefrom. Bearing assemblies 148 and 150 are therefore disposed below and above the movable plate or disk 142, and are held assembled on the mounting stud 146 by the washer 152 and the nut 154 threadedly engaged with an upper threaded portion of the mounting stud 146. An opening 156 is formed in the movable disk 142 through which the holding rod 78 extends for the purpose of holding or releasing the ejecting mechanism within the launching guide tube assembly. The opening 156 is arcuate in shape so as to limit angular movement of the movable plate 142 with respect to the holding rod 78. The opening 156 includes a radially enlarged portion defined between a radially inner edge 158 and a radially outer edge 160. The radially smaller portion of the opening 156 is formed between the radially inner edge 158 and the edge 162 as more clearly seen in FIGURE 5. Accordingly, when the movable plate 142 is disposed in one limit position as shown in FIGURE 5, the holding rod 78 will be disposed within the radially smaller portion of the opening so that a retractable hook member 164 pivotally connected to the lower end portion of the holding rod by the pin 166 may engage underneath the movable plate 142 so as to thereby hold the ejecting mechanism in preparation for launching. The hook member 164 is therefore pivotally retractable against the bias of the spring element 168 in order to permit insertion of the holding rod 78 through the opening 156 when the apparatus is being charged. Also mounted by the hook member 164 is a spring biased detent element 170 arranged to engage depressions in the undersurface of the movable plate member 142 which may therefore be provided with a bearing surface portion 172. Thus, the detent element 170 will be operative to yieldingly hold the circular plate member 142 in a limit position such as shown in FIGURE 5 or in an intermediate position before the plate member is angularly displaced to a position wherein the hook member 164 is released.

In order to selectively position the movable plate member 142 and control operation of the apparatus, a selector lever 174 may be pivotally mounted in fixed relation to the apparatus for movement between a locked position such as illustrated in FIGURE 5 to an automatically operative position defined by the notch 176 in the rack 178 angularly spaced from the notch 180 within which the selector is disposed in FIGURE 5. A third position defined by the notch 182 is provided in the fixed rack 178 whereby the device may be manually launched. The selector lever 174 is therefore connected to one end of a Bowden wire cable 184 the opposite end of which is connected to a stop element 186 which abuts against the control link 188 pivotally connected to the link assembly 138 at its pivotal connection to the movable plate member 142. The control link 188 therefore includes a tubular portion 190 within which the stop element 186 is movable under control of the Bowden cable 184. The tubular portion 190 is therefore secured to a flexible cable sheathing 192 through which the Bowden cable 184 extends. A pivotal clamp element 194 embraces the sheathing 192 and is pivotally connected to an extension 196 of the bracket assembly. Threadedly mounted within the tubular portion 190 is an insert 198 through which the Bowden wire 184 extends. It will therefore be apparent, that the stop element 186 may be displaced from the position shown in FIGURE 5 abutting the link member 188 and thereby preventing clockwise displacement of the plate member 142 by the linkage assemblies 138 and 140. Therefore, in the position illustrated in FIGURE 5, the selector 174 will be effective to lock or prevent the inertia-responsive device 24 from releasing the launching mechanism. When, however, the selector 174 is displaced to the automatically operative position defined by the notch 176, the stop element 186 will be abutting the insert 198 so that clockwise movement may be imparted to the movable plate member 142 by the inertia-responsive device in order to release the holding hook member 164 by displacement of the opening 156 so that the hook member will be in the enlarged portion of the opening. Should it be desired however to manually release the launching mechanism, the selector 174 may be displaced to the manually operative position defined by the notch 182 which would cause the stop element 186 to engage the insert 198 and displace the link element 180 connected thereto through the tubular portion 190. This will cause clockwise displacement of the plate member 142 in order to effect release.

From the foregoing description, the construction, operation and utility of the location indicating signal device of the present invention will be apparent. It will therefore be appreciated, that operation of the apparatus is assured because of ejection of the components from the launching tube prior to inflation of the balloon, the ejection automatically initiating inflation and operation of a signal-emitting device. Of particular importance in connection with the foregoing, is the fact that inflating gas is discharged against the outward end of the balloon to which the closure assembly is connected. Also, the arrangement of the apparatus is such that inspection of the balloon may be made by removal of the closure assembly which will not trigger launching. The closure assembly also will provide a weather sealing protection for the balloon while the inflation of the balloon by a vortical flow through the tube 106 will be effective to dissipate heat and overcome adhesion between parts tending to retard launching from launching tube 36. Also, operation of the signal-emitting device 108 occurs only when the balloon is successfully launched from the launching tube which launching will also withdraw the inflation assembly therewith so as to avoid interruption of the supply of inflation gas to the balloon. Also, the selectively controlled releasing assembly permits launching to be effected either manually or prevented or effected automatically by means of the inertia-responsive device. Thus, the apparatus may be adaptable for various uses.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A crash signal locating device comprising launching guide means, inflatable means mounted in folded condition within said launching guide means for launching therefrom, removable closure means mounted on said launching guide means in protective relation to the inflatable means for launching therewith, inflation means operatively connected to said inflatable means for ejection therewith from the launching guide means prior to inflation of the inflatable means, releasable ejecting means mounted in said launching guide means for launching the inflation means, the inflatable means and the removable closure means, inertia-responsive means mounted in fixed relation to said launching guide means for continuously sensing impact forces, and selectively controlled release means operatively connecting the inertia-responsive means to the ejecting means for manual or automatic release thereof in response to impact forces.

2. The combination of claim 1, wherein said ejecting means comprises, a seating member adapted to receive the inflation means, a folded anchor line interconnecting said seating member to the inflation means, holding means connected to the seating member and engageable by the selectively controlled release means to prevent ejection thereof, and spring means mounted within said launching guide means for ejecting the seating member therefrom upon release of the holding means.

3. The combination of claim 2 wherein said holding means includes rectractable hook means insertable into the selectively controlled release means for engagement therewith and detent means mounted in the hook means for yieldably holding the release means in an inoperative and an automatically operative position.

4. The combination of claim 3 wherein said selectively controlled release means comprises, a movable member mounted for limited movement relative to the ejecting means, linkage means operatively connecting the inertia-responsive means to the movable member for imparting movement thereto in one direction for releasing the ejecting means, and selector control means operatively connected to said linkage means to selectively prevent displacement of the movable member in said one direction from the inoperative position or selectively displace the movable member in said one direction to the automatically operative position and a manual release position.

5. The combination of claim 4, wherein said inertia-responsive means comprises, an arcuate tube having opposite open ends, an impact ball freely movable within said tube between said opposite ends thereof, displaceable impact elements pivotally mounted on said tube adjacent the ends thereof for engagement by the impact ball, and debris end covers mounted on said ends of the tube, said impact elements being operatively connected to the linkage means of the selectively controlled release means.

6. The combination of claim 5, wherein the launching guide means comprises, an elongated tubular member having internal means for longitudinally guiding non-rotatable ejection of the inflation means, aligning means mounted on the tubular member for orientating and centering the ejecting means therein with respect to the release means, and mounting bracket means for receiving the aligning means of the tubular member for mounting thereof in fixed relation to the release means.

7. The combination of claim 1 wherein said selectively controlled release means comprises, a movable member mounted for limited movement relative to the ejecting means, linkage means operatively connecting the inertia-responsive means to the movable member for imparting movement thereto in one direction for releasing the ejecting means, and selector control means operatively connected to said linkage means to selectively prevent displacement of the movable member in said one direction from an inoperative position or selectively displace the movable member in said one direction to an automatically operative position and a manual release position.

8. The combination of claim 7, wherein said inertia-responsive means comprises, an arcuate tube having opposite open ends, an impact ball freely movable within said tube between said opposite ends thereof, displaceable impact elements pivotally mounted on said tube adjacent the ends thereof for engagement by the impact ball, and debris end covers mounted on said ends of the tube, said impact elements being operatively connected to the linkage means of the selectively connected release means.

9. The combination of claim 1, wherein said inertia-responsive means comprises, an arcuate tube, having opposite open ends, an impact ball freely movable within said tube between said opposite ends thereof, displaceable impact elements pivotally mounted on said tube adjacent the ends thereof for engagement by the impact ball, and debris end covers mounted on said ends of the tube, said impact elements being operatively connected to the linkage means of the selectively connected release means.

10. The combination of claim 1, wherein the launching guide means comprises, an elongated tubular member having internal means for longitudinally guiding non-rotatable ejection of the inflation means, aligning means mounted on the tubular member for orientating and centering the ejecting means therein with respect to the release means, and mounting bracket means for receiving the aligning means of the tubular member for mounting thereof in fixed relation to the release means.

11. A crash signal locating device comprising, launching guide means, inflatable means mounted in folded condition within said launching guide means for launching therefrom, removable closure means mounted on said launching guide means in protective relation to the inflatable means for launching therewith, inflation means operatively connected to said inflatable means for ejection therewith from the launching guide means prior to inflation of the inflatable means, mechanical ejecting means mounted in said launching guide means for launching the inflation means, the inflatable means and the removable closure means, and selectively controlled release means operatively aligned with said ejecting means by the guide means for ejection thereof with the inflation means.

12. An inertia controlled release mechanism comprising, a holding member, hook means engageable with said holding member, detent means for yieldably holding the holding member in either one of two positions when engaged by said hook means, selectively controlled means operatively connected to the holding member for displacement thereof in one direction to one of said two positions, an arcuate tube having opposite open ends, an inertia member freely movable within said tube between the opposite ends thereof, impact sensing elements movably mounted within the tube adjacent to said opposite ends for engagement by the inertia member, and linkage means operatively connecting said impact sensing elements to the holding member for unidirectional displacement thereof in said one direction.

13. In a distress signal device, a launching tube, signal display means mounted within said tube, elevating means operatively connected to the display means in a predetermined orientation within the tube, ejection means engageable with the elevating means for launching thereof from the tube with the display means, releasable hook means connected to the elevating means, a holding member engageable with the hook means for holding the elevating means within the tube against the urge of the ejection means, selectively operated means connected to the holding member for displacement thereof from a position engaging the hook means when the elevating means is in said predetermined orientation within the tube, and guide means mounted by the tube for operatively aligning said hook means with the holding member with the elevating means in said predetermined orientation prior to and during ejection of the elevating means.

References Cited by the Examiner

UNITED STATES PATENTS

| | | | |
|---|---|---|---|
| 1,836,495 | 12/1931 | Paulson | 116—124.9 |
| 2,144,002 | 1/1939 | Wallace et al. | 73—514 |
| 2,192,450 | 3/1940 | Miller | 116—124.9 |
| 2,244,417 | 6/1941 | Bacon | 73—514 |
| 2,273,552 | 2/1942 | Bacon | 73—514 |
| 2,559,918 | 7/1951 | Grieb | 9—9 |
| 2,778,332 | 1/1957 | Talbot | 116—124.9 |
| 2,825,803 | 3/1958 | Newbrough | 116—124.9 |
| 2,831,967 | 4/1958 | Bayze | 116—124.9 |
| 2,853,724 | 9/1958 | Smith | 9—9 |
| 2,867,799 | 1/1959 | Decasie | 116—124.9 |
| 2,950,365 | 8/1960 | Bolstad | 200—61.52 |
| 3,035,285 | 5/1962 | Squires | 116—124.9 |
| 3,038,973 | 6/1962 | Alpert | 73—492 |
| 3,088,136 | 5/1963 | Kauffman et al. | 9—9 |
| 3,107,370 | 10/1963 | Gaylord | 116—124.9 |
| 3,137,458 | 6/1964 | Hagan | 340—366 |

LOUIS J. CAPOZI, *Primary Examiner.*